March 6, 1945.   H. D. WOODWORTH   2,370,901
AGRICULTURAL MACHINE
Filed March 9, 1944   2 Sheets-Sheet 1

H. D. Woodworth
INVENTOR.

BY
ATTORNEYS.

Patented Mar. 6, 1945

2,370,901

UNITED STATES PATENT OFFICE 2,370,901

AGRICULTURAL MACHINE

Herald D. Woodworth, Madison, Ohio

Application March 9, 1944, Serial No. 525,720

4 Claims. (Cl. 97—47)

This invention relates to agricultural machines, and more particularly to machines for cultivating and conditioning the soil in vineyards.

An important object of the invention is to provide a machine of this character designed for removing trash, such as grass, weeds or the like which have been thrown close to the vines, during the plowing operation.

Another object of the invention is to provide a machine for attachment to the well known tractor commonly used in soil cultivation, the attachment being mounted on the right front wheel spindle of the tractor.

Still another object of the invention is the provision of an attachment of this character embodying a pivoted beam carrying a scraping blade, the beam being controlled by the operator occupying the seat of the tractor, to the end that the blade may be readily adjusted laterally to operate close to the grape vines, without danger of the scraper damaging the vines.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
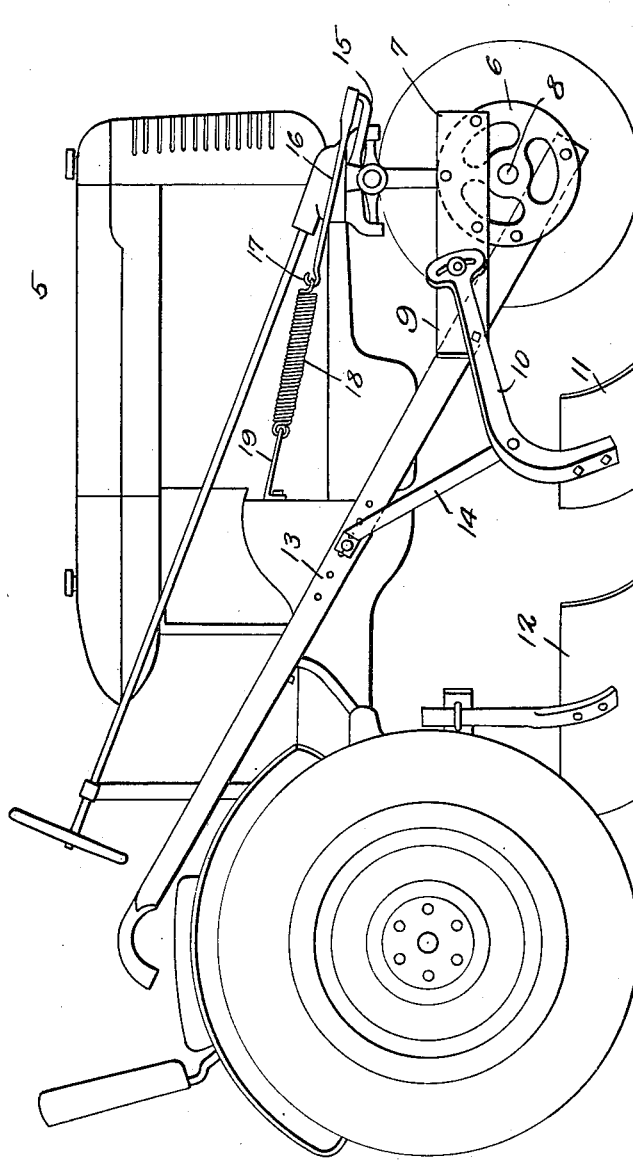
Figure 1 is a side elevational view disclosing the attachment as mounted on the right front wheel spindle of a tractor.

Referring to the drawings in detail, the reference character 5 designates a tractor the right front wheel thereof having been removed disclosing the right front wheel casting 6. It will of course be understood that this casting is mounted on the usual wheel spindle and rotates thereon.

The attachment embodies a wide plate 7 which is bolted to the wheel casting 6 at a point above the axle 8.

As shown, the plate 7 extends rearwardly and is formed with an outwardly extended rear end portion 9 to which the scraper beam 10 is pivotally connected for vertical adjustment.

Mounted on the free end of the scraper beam 10 is a scraper blade 11 which in operation, acts as a hoe, the angle at which the blade 11 is disposed, causing the material scraped by the blade, to be fed inwardly and laterally in the direct path of the rear supporting wheels of the tractor, where the material is picked up by the hoe 12 which is mounted on the beam which under normal conditions, provides the support for the cultivator blades of the tractor. This blade 12 is of a length to direct the trash removed by the blade 11, towards the center of the tractor.

The reference character 13 designates an elongated handle that controls the movements of the scraper blade 11. This handle 13 is of a length to extend from a point adjacent to the right front wheel spindle, to a point adjacent to the operator's seat, the forward end of the handle being bolted to the wheel casting 6, at a point below the axle 8, as clearly shown by Figure 1 of the drawings.

A brace bar is indicated at 14 and connects the scraper beam 10 with the handle 13, to secure the scraper beam 10 against lateral movement, with respect to the handle.

Figure 2:
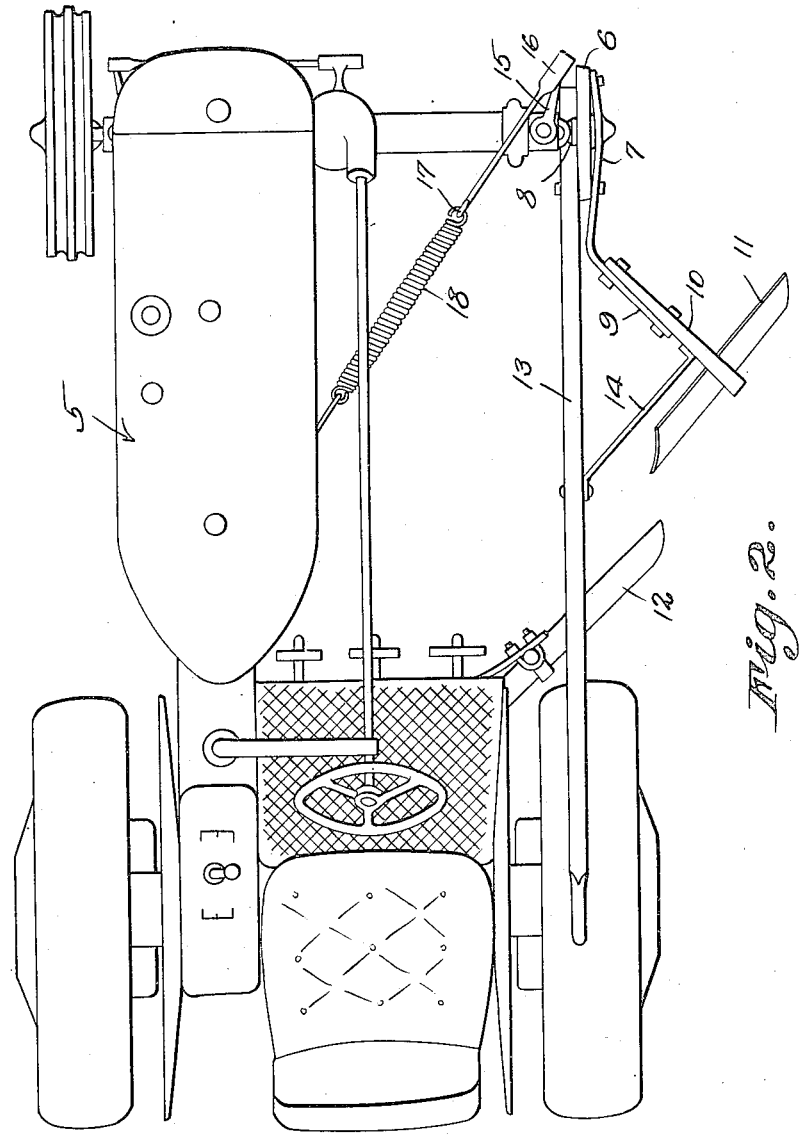
Figure 2 is a plan view thereof.

The usual steering arm of the right front wheel spindle, is indicated by the reference character 15 to which the drag link 16 is connected. The drag link at the right hand side of the tractor is disconnected from the usual steering mechanism, as shown by Fig. 2 of the drawings. The inner end of the drag link 16 is formed with a hook 17 to which one end of the coiled spring 18 is connected, the opposite end of the coiled spring being secured to the tractor frame, by means of the brackets 19. Due to this construction, it will be seen that when the handle 13 is moved outwardly, the spring 18, which is under pressure, will act to draw the outer end of the steering arm 15 inwardly, thereby assisting the operator in moving the blade away from the tractor, or to a position close to the grape vines under cultivation.

From the foregoing it will be seen that due to the construction shown and described, the operator of the tractor may readily control the movements of the blade 11, to adjust the blade for close work to the grape vines. It will also be noted that because the attachment is used in connection with a tractor, the operator may, by driving the tractor slowly, readily stop the tractor by throwing out the clutch, should the blade 11 be directed dangerously close to the vines, thus avoiding damaging the vines.

From the foregoing detailed description it is believed that the operation of the attachment will be clear, and that further explanation is unnecessary.

What is claimed is:

1. A cultivator attachment for tractors, comprising a wide plate adapted to be secured to the wheel casting mounted on one of the front wheel spindles of a tractor, said wheel casting having its wheel removed therefrom and being further disconnected from the tractor steering mechanism, an elongated handle adapted to be connected with the plate and wheel casting, a beam connected with the plate and wheel casting, a scraper blade secured to one end of said beam and adapted to move laterally with the beam, whereby said blade may operate close to the growing plants, and the free end of the operating handle being positioned in proximity to the driver's seat of the tractor.

2. A cultivator attachment for tractors, comprising a handle, an elongated plate having an offset end portion secured to the wheel casting mount on a front axle spindle of the tractor, said wheel casting having its wheel removed therefrom and being further disconnected from the tractor steering mechanism, at a point above the axle of the spindle, the forward end of said handle being connected to said wheel casting at a point below the axle, a beam adjustably connected to the offset end of the plate, a blade secured to the beam and yieldable means adapted to move said wheel casting and beam laterally.

3. A cultivator attachment for tractors, comprising an elongated horizontal plate adapted to be secured to the wheel casting mounted on a front axle of a tractor, said wheel casting having its wheel removed therefrom and being further disconnected from the tractor steering mechanism, an elongated handle, said elongated handle being connected with the wheel casting at a point below the axle, the opposite end of the handle being extended rearwardly to a point adjacent to the seat of the tractor, a beam adjustably connected with said plate, and a curved scraping blade secured to the free end of the beam.

4. A cultivator attachment for tractors, comprising an elongated horizontal plate adapted to be secured to the wheel casting mount on a front axle of a tractor, said wheel casting having its wheel removed therefrom and being further disconnected from the tractor steering mechanism, a handle connected with the plate, said handle extending to a point in proximity to the seat of the tractor, said handle adapted to operate to move the wheel casting laterally, a blade carrying beam mounted on the plate to move therewith, and an elongated scraper blade supported at the rear of the blade of the beam and being disposed to an oblique angle to receive and direct material from the first mentioned blade, towards the center of the tractor.

HERALD D. WOODWORTH.